US005243431A

United States Patent [19]

Inagaki

[11] Patent Number: 5,243,431

[45] Date of Patent: Sep. 7, 1993

[54] AUDIO BANDPASS FILTER ADAPTIVE TO DIFFERING TELEVISION STANDARDS

[75] Inventor: Ryosuke Inagaki, Kyoto, Japan

[73] Assignee: Rohm Co., Ltd., Kyoto, Japan

[21] Appl. No.: 857,440

[22] Filed: Mar. 25, 1992

[30] Foreign Application Priority Data

Mar. 27, 1991 [JP] Japan .................................. 3-087553

[51] Int. Cl.[5] ................................................ H04N 5/60

[52] U.S. Cl. .................................... 358/198; 358/196; 333/215; 455/191.1; 455/266; 455/191.3

[58] Field of Search ....................... 333/168, 174, 215; 358/158, 38, 195.1, 191.1, 198, 196; 455/191.1, 191.2, 191.3, 266, 214, 337

[56] References Cited

U.S. PATENT DOCUMENTS 4,381,489 4/1983 Canning et al. ..................... 333/215
4,480,236 10/1984 Harris .................................. 333/174
4,651,196 3/1987 Harwood et al. ...................... 338/38
4,688,082 8/1987 Kato .................................. 358/38 X
4,724,407 2/1988 Miura et al. ..................... 333/174 X
4,792,993 12/1988 Ma ....................................... 455/266
4,849,721 6/1989 Matsuura ............................ 333/174
4,903,332 2/1990 Hansen ............................ 455/337 X
5,095,363 3/1992 Zuffada et al. .............. 358/191.1 X

*Primary Examiner*—Mark R. Powell
*Attorney, Agent, or Firm*—Fish & Richardson

[57] ABSTRACT

A filter equipment comprises a plurality of filters, which are connected in cascade or in parallel. Characteristics of each filter are controlled according to an applied current. Desired characteristics can be realized by a relatively simple circuit configuration. The filter is controlled to adapt to PAL or NTSC standards, for example.

22 Claims, 7 Drawing Sheets

CURRENT CONTROL CIRCUIT
FILTER
FILTER
Vcc
Vcc
SW
Fi
VC
Vr
$F_o'$
$I_1$ or $I_2$
$I_1$ or $I_2$
41A
41B
61A
61B
50
30
52
54
56
58
11
12
21
23

Vcc
318
320
V2
322
V1
324
oa
ob
I1
I2
326
328
340
343
346
30B
338
342
344
332
310
306
30A
336
330
304
312
334
314
308
Vb
302
SW
316
30

Fo
22
I1 or I2
166
FILTER (BPF)
15
122
124
I1 or I2
164
FILTER (TRAP)
14
121
I1 or I2
162
FILTER (BPF)
13
118
120
I1 or I2
160
FILTER (TRAP)
12
I1 or I2
158
FILTER (BPF)
11
110
Vcc
114
Fi
21
116
GND
112

AUDIO BANDPASS FILTER ADAPTIVE TO DIFFERING TELEVISION STANDARDS

BACKGROUND OF THE INVENTION

1. Field of the Invention

This invention relates to active filter equipment, and more particularly to improved filter equipment used as a discrete type filter, a filter for a hybrid integrated circuit, or a linear phased filter having linear phase characteristics.

2. Description of the Related Art

It is known how to selectively operate a plurality of filters having different filter characteristics as shown in FIG. 8 of the accompanying drawings. Specifically, filters 2, 4 have different characteristics (such as passbands). When an input IN1 is applied to the filter 2, a switch 6 is set to the side for the filter 2, thereby obtaining a filtered output signal OUT. On the other hand, when an input IN2 is applied to the filter 4, the switch 6 is set to the side for the filter 4, thereby obtaining a filtered output signal OUT via the filter 4.

With this arrangement, it is possible to filter a class of input signals by the filter 2 and to filter another class of input signals by the filter 4. In other words, the filters having different characteristics can be selectively operated according to the class of input signals, i.e. operation modes.

However, the more operation modes, the more filters that are needed, which means an increase in configuration, size, number of components and cost of the filters. The filters cannot operate efficiently because some filters are in operation while others are on standby.

SUMMARY OF THE INVENTION

It is therefore an object of this invention to provide a compact, effective and economic filter apparatus which is capable of controlling filter characteristics as effectively as conventional filter equipment.

According to a first aspect of the invention, a filter equipment including a filter means for filtering an input signal with filter characteristics which vary with applied currents, and a current supply means for supplying currents having different values to the filter means is provided.

In this arrangement, one filter equipment can function as an equipment having different characteristics, while being simple in configuration, efficient in operation, and inexpensive in terms of manufacturing cost.

The filter equipment preferably includes a plurality of filter means. When the filter means includes gyration-admittance cells, the filter characteristics can be effectively controlled according to currents applied.

The filter means may be connected in cascade or in parallel. The currents to these filter means may be controlled simultaneously.

The current supply means usually includes a plurality of constant-current sources and a connecting means for selectively connecting the constant-current sources to the filter means. The constant-current sources are shared by the filter means. The constant-current sources may be also provided for the filter means respectively. Further, it is possible for at least two filter means to share one of the constant-current source groups, which makes the current sources very simple.

The connecting means includes switches for changing connections between the constant-current sources and the filter means, and means for controlling the switches.

The filter means have their filter characteristics controlled, i.e. values of the center frequency.

According to a second aspect of the invention, a filter equipment including a plurality of interconnected filter means for filtering input signals with filter characteristics which vary according to applied currents; means for outputting a digital control signal to indicate values of currents to be applied to the filter means; switches including output terminals according to the number of levels of the control signal, the switches allowing one of the output terminals to send constant currents having different values according to the levels of the control signal; a plurality of current mirror means connected to the output terminals of the switches, the current mirror means supplying no current when no current arrives via the output terminals, and supplying a current whose value is the same as the current that arrives via the output terminals; and current supply means associated with each filter means, the current supply means simultaneously receiving constant currents from a plurality of current mirror means and supplying to the filter means currents having values the same as the values of the currents received from the current mirror means is provided.

The switches include means for generating a plurality of reference voltages, and a plurality of means for comparing one of the reference voltage levels with a control signal level and for outputting a constant current whose value corresponds to the level of the control signal when compared results meet a preset condition. Such switches can be relatively easily composed of integrated circuit.

According to a third aspect of the invention, an Audio Frequency Modulation (AFM) carrier filter equipment including a first filter means for receiving television signals and for filtering the input television signals with filter characteristics which vary with an applied current; and current supply means for supplying currents having different values to the filter means is provided.

In this arrangement, the first filter means receives a first channel input signal (e.g. a left channel signal) of a first system television signal (e.g. NTSC color television) and a first channel input signal of a second system television signal (e.g. PAL color television), and the current supply means changes the current values according to which of the first and second systems is to be used.

Since the television signals are received via two channels, left and right channels, it is preferable to use a second filter means for the second channel signals (i.e. right channel signals). The second filter means has a configuration similar to that of the first filter means.

DETAILED DESCRIPTION OF PREFERRED EMBODIMENTS

Figure 1:
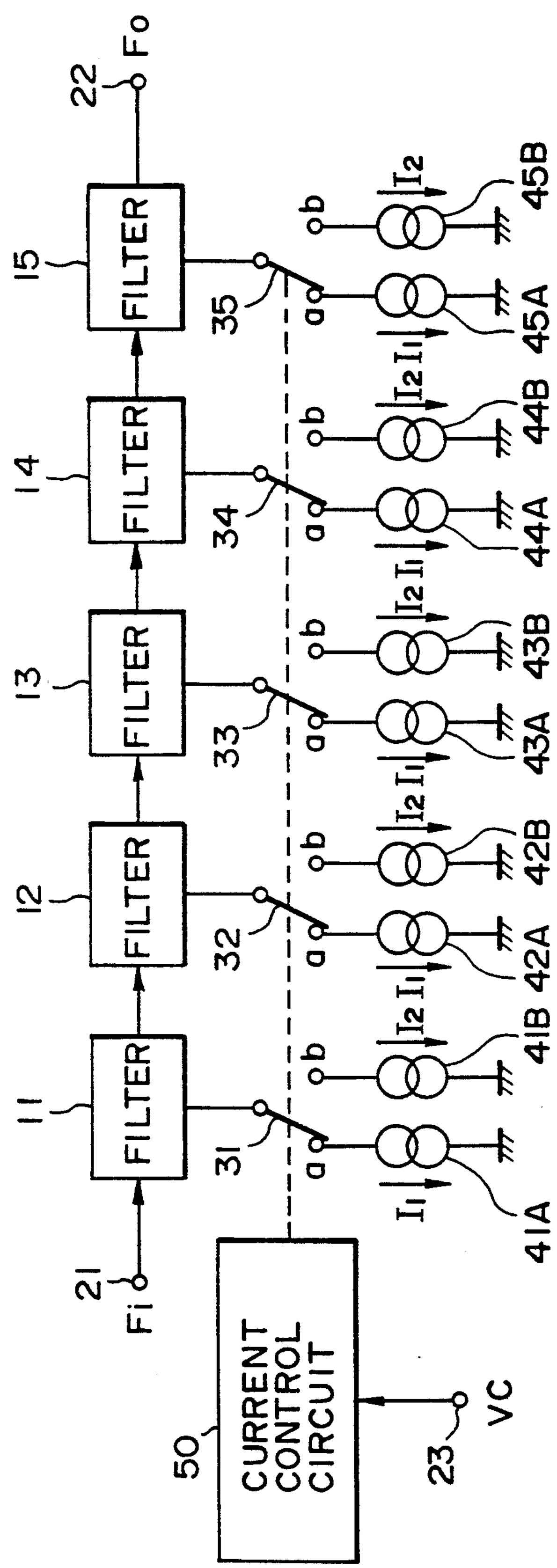
FIG. 1 is a block diagram showing the configuration of a filter equipment according to a first embodiment of the invention.

As shown in FIG. 1, a filter equipment comprises filters 11, 12, 13, 14 and 15 which are cascaded. The filter 11 receives an input signal Fi via an input terminal 21. The filter 15 outputs a signal Fo via an output terminal 22. These filters are selectively operated according to their respective characteristics (such as center frequency values f0) by changing currents to be supplied to the filters. The filters are respectively connected to constant-current sources via switches.

For instance, the filter 11 is connected to two constant-current sources 41A, 41B via a switch 31. When the switch 31 is on the side a, the constant-current source 41A is connected to the filter 11 to supply a current I1 thereto. Otherwise, the constant-current source 41B is connected to the filter 11 to supply a current I2 thereto.

Similarly, the filters 12, 13, 14 and 15 are respectively connected to the constant-current sources 42A, 42B, 43A, 43B, 44A, 44B, 45A and 45B via switches 32, 33, 34 and 35. Therefore, the switches 31 to 35 are operated to select which of the currents I1 and I2 to apply to the filters.

The switches 31 to 35 are electrically controlled by a current control circuit 50. The current control circuit 50 changes the set positions of the switches 31 to 35 according to a control input VC from a control input terminal 23. The control input VC varies with the operation modes, i.e. filter characteristics to be realized. Therefore, it is possible to selectively operate filters according to values of the control input VC to obtain desired filter characteristics.

The filter equipment of this embodiment is applicable as an AFM carrier filter equipment for a multiple-video recorder. In this case, it is necessary to extract carriers having different frequency values. For an NTSC (National Television System Committee) color television, it is necessary to obtain 1.3 MHz carrier frequency the left channel and 1.7 MHz carrier frequency for the right channel. For a PAL (Phase Alteration by Line) color television, it is necessary to obtain 1.4 MHz carrier frequency for the left channel, and 1.8 MHz for the right channel. The filter equipment of this embodiment can economically satisfy the foregoing requirements with a compact and simple configuration.

Figure 2:
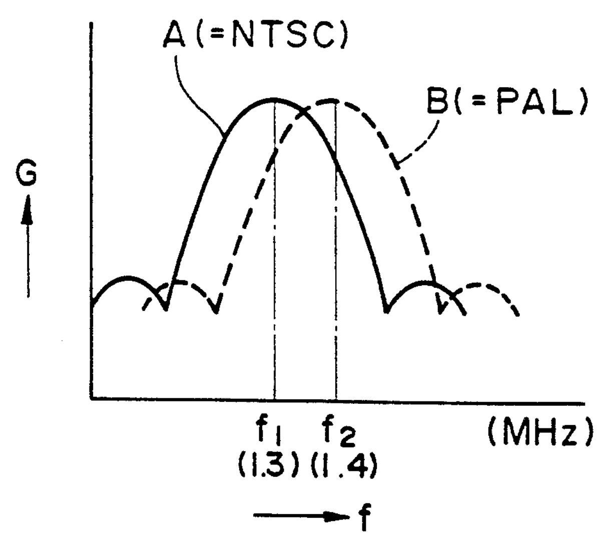
FIG. 2 is a graph showing the filter characteristics of the filter equipment of FIG. 1.

To extract the left channel carrier of the NTSC color television, the AFM carrier filter equipment should preferably have a center frequency which is equal to the center frequency f1 (=1.3 MHz) of the left channel carrier of the NTSC color television, as shown by A in FIG. 2. With the PAL color television, the AFM carrier filter equipment should preferably have the center frequency equal to the center frequency f2 (=1.4 MHz) of the left channel carrier frequency. According to this embodiment, it is possible to select either the characteristics A with the center frequency f1 or the characteristics B with the center frequency f2. Specifically, these characteristics A and B are selected by operating the switches 31 to 35 according to which of the currents I1 and I2 is to be supplied to the filters 11 to 15.

Figure 3:
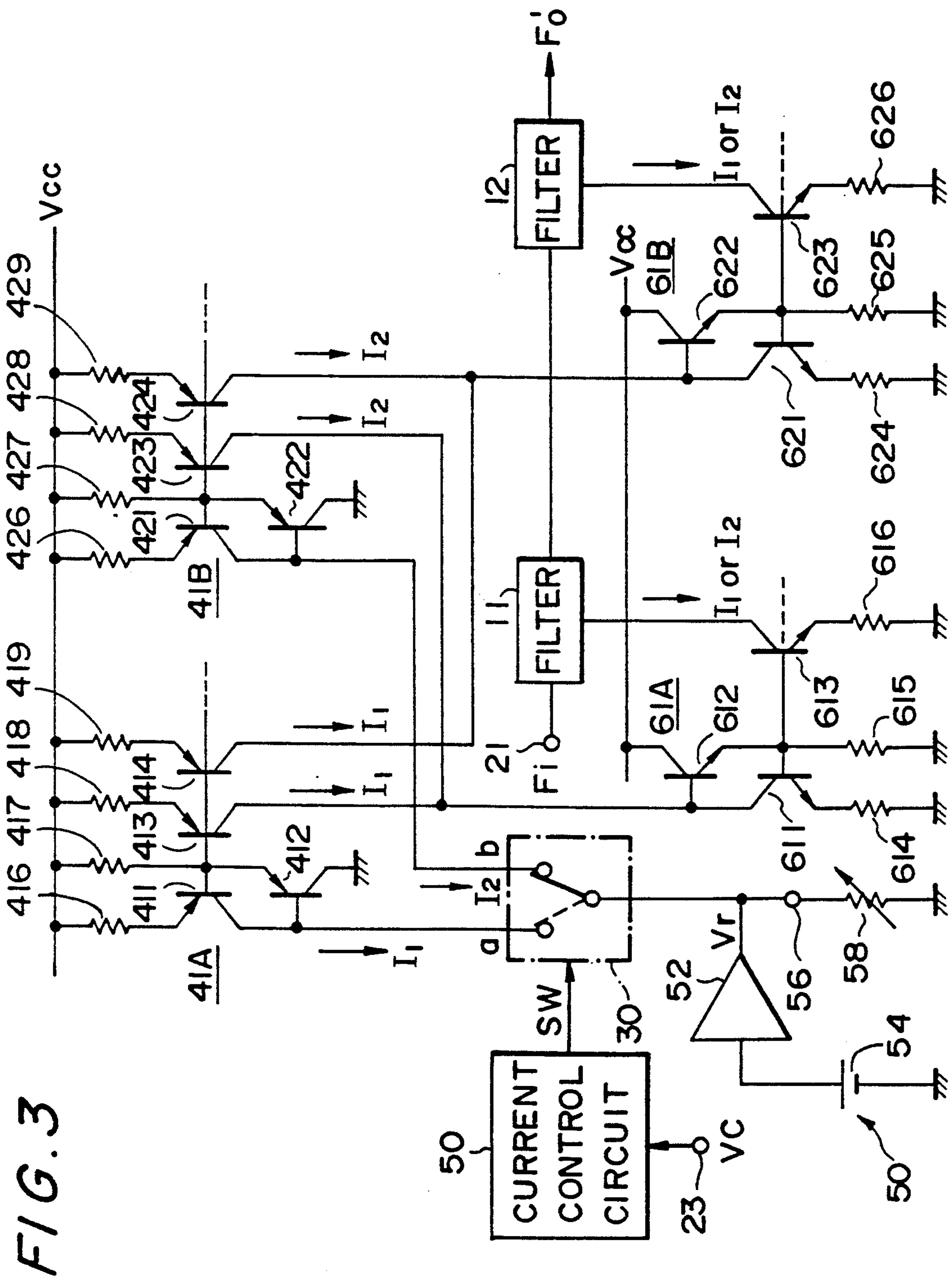
FIG. 3 is a circuit diagram of a filter equipment according to a second embodiment of the invention.

FIG. 3 shows the circuit configuration of a filter equipment according to a second embodiment. For simplification, identical parts have identical reference numbers to those of FIG. 1. In this embodiment, two filters 11 and 12 are cascaded. The output signal of the filter 12 is represented by F0'.

This filter equipment operates on the same principle as that of the foregoing filter equipment. The filter equipment of the first embodiment is modified to be suitable as an AFM carrier filter equipment, which can selectively extract carriers for the NTSC and PAL color televisions. Constant-current sources 41A, 41B are used for the filter 11, while constant-current sources 42A, 42B are for the filter 12 in the first embodiment. These constant-current sources however are shared by the filters 11, 12. In FIG. 3, they are shown by reference numbers 41A, 41B. The switches 31, 32 of the first embodiment are also shared by the filters 11, 12, and are assigned number 30 in FIG. 3.

The filter equipment includes a buffer 52 and a constant voltage source 54. The constant voltage source 54 supplies a constant voltage to the buffer 52, which forwards an output Vr to a terminal 56. The terminal 56 is connected to a variable resistor 58, the resistance value of which is determined so as to control a current to be applied thereto. Therefore, it is possible to control the currents I1 and I2 to be applied to the input terminals of the constant-current sources 41A, 41B via output terminals a, b of the switch 30.

The output Vr of the buffer 52 is applied to an input terminal of the switch 30. The output terminals a, b of the switch 30 are connected to the constant-current sources 41A, 41B, respectively. The current control circuit 50 supplies a signal SW to the switch 30 to indicate which of the NTSC and PAL modes to use, i.e. which of the NTSC and PAL characteristics the filters 11, 12 should have. The switch 30 is set to the output terminal a or b according to the signal SW, so that the variable resistor 58 is connected to the input part of the constant-current source 41A or 41B.

The constant-current source 41A includes transistors 411, 412, 413 and 414. The emitters of these transistors are connected to a power source Vcc via resistors 416, 417, 418, 419. Specifically, the output terminal a of the switch 30 is connected to the collector of the transistor 411 and to the base of the transistor 412. The bases of the transistors 413, 414 are connected to the base of the transistor 414 and the emitter of the transistor 412. These transistors and resistors constitute a current mirror circuit while the transistors 411, 412 constitute an input part of the current mirror circuit. Therefore, the transistors 413, 414 receive at their collectors the current having the value same as that of the current applied to the collector of the transistor 411.

The constant-current source 41B includes transistors 421, 422, 423, 424. The emitters of these transistors are connected to the power source Vcc via resistors 426, 427, 428, 429. The output terminal b of the switch 30 is connected to the collector of the transistor 421 and to the base of the transistor 422. The bases of the transistors 423, 424 are connected to the base of the transistor 421 and the emitter of the transistor 422. These transistors and resistors constitute another current mirror circuit. The transistors 421, 422 serve as an input part of the current mirror circuit. Therefore, the transistors 423, 424 receive at their collectors the current having the value same as that of the current flowing to the collector of the transistor 421.

The filter 11 is connected to a current mirror circuit 61A, which includes transistors 611, 612, 613. In the current mirror circuit 61A, the transistors 611, 612 serve as an input part while the transistor 613 serves as an output part. The emitters of these transistors are connected to resistors 614, 615, 616. Specifically, the collector of the transistor 611 is connected to the base of the transistor 612. The emitter of the transistor 612 and bases of the transistors 611, 613 are connected together. The collector of the transistor 612 is connected to the power source Vcc.

The filter 12 is connected to a current mirror circuit 61B, which includes transistors 621, 622, 623. In the current mirror circuit 61B, the transistors 621, 622 serve as an input part while the transistor 623 serves as an output part. The emitters of these transistors are connected to resistors 624, 625, 626. Specifically, the collector of the transistor 621 is connected to the base of the transistor 622. The emitter of the transistor 622 and bases of the transistors 621, 623 are connected together. The collector of the transistor 622 is connected to the power source Vcc.

The collectors of the transistors 413, 423 of the constant-current sources 41A, 41B respectively are connected to the collector of the transistor 611 of the current mirror circuit 61A. The collectors of the transistors 414, 424 of the constant-current sources 41A, 41B respectively are connected to the collector of the transistor 621 of the current mirror circuit 61B. Therefore, the current mirror circuits 61A, 61B respectively provide the filters 11, 12 with the currents whose values are same as those of the currents supplied by the constant-current sources 41A, 41B.

In the second embodiment, the constant-current source 41A enables the filter equipment to have the characteristics to extract the NTSC mode carriers. The constant-current source 41B enables the filter equipment to have the characteristics to extract the PAL mode carriers. When the switch 30 is set to the side a in response to the signal SW, no input current comes from the source 41B is 0, but an input current Ii arrives from the source 41A, flowing to the filter 11. On the contrary, when the switch 30 is set to the side b, no input current comes from the source 41A, but an input current I2 arrives from the source 41B, flowing to the filter 12. The characteristics of the filters 11, 12 are controlled according to the currents supplied to these filters.

When the source 41A supplies the current I1 to the filters 11, 12, the filters 11, 12 are controlled to have the characteristics suitable to the NTSC mode. When the source 41B supplies the current I2, the filters 11, 12 are controlled to have the characteristics suitable to the PAL mode. The two kinds of filter characteristics shown in FIG. 2 can be attained by a simple circuit configuration.

Figure 4:
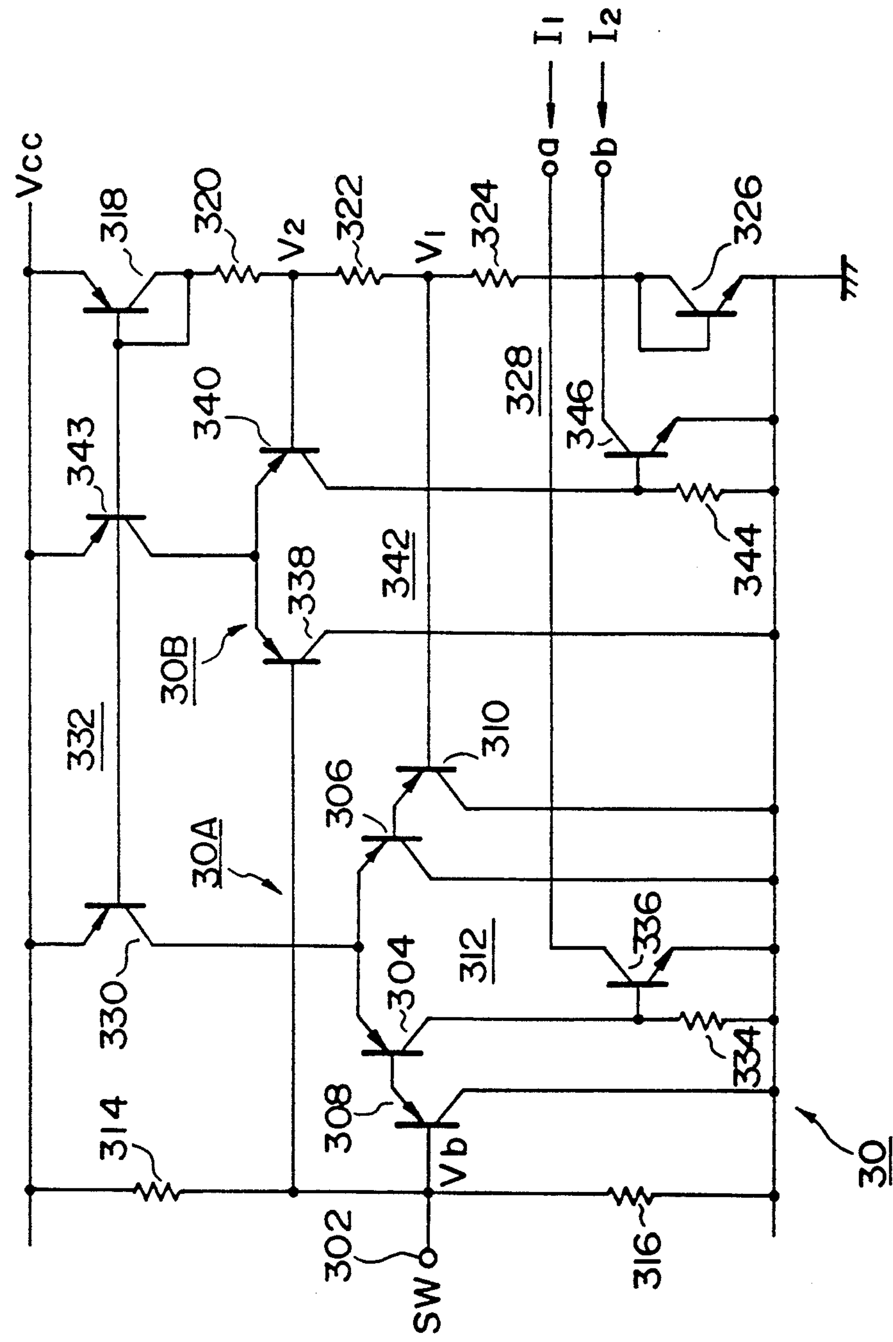
FIG. 4 is a circuit diagram showing the circuit configuration of switches in the second embodiment.

Operation of the switch 30 plays a very important role in the second embodiment. In other words, the switch 30 is set to either the side a or b in response to the signal SW. The switch 30 has a circuit configuration as shown in FIG. 4.

The switch 30 is an analog switch, a bipolar logic circuit composed of bipolar transistors.

The switch 30 includes switch members 30A, 30B which are operable in response to the signal SW applied via a terminal 302. The switch member 30A outputs the current I1 when the signal SW represents the NTSC mode. The switch member 30B outputs the current I2 when the signal SW represents the PAL mode.

The switch unit 30A has a differential transistor pair 312, a half of which is transistors 304, 308, and the other half of which is transistors 306, 310. One input part of the differential transistor pair 312, i.e. the base of the transistor 308 is connected to the terminal 302 and voltage-dividing resistors 314, 316. The transistor 308 receives at its base the signal SW as well as a voltage Vb which is obtained by dividing the power source voltage Vcc by the resistors 314, 316.

The other input part of the differential transistor pair 312, i.e. the base of the transistor 310, is connected to a reference voltage generating circuit 328, which generates a reference voltage V1 to be supplied to the base of the transistor 310.

The reference voltage generating circuit 328 includes a constant-current source composed of a transistor 318 whose base and collector are shorted, and a diode composed of a transistor 326 having shorted base and collector. The emitter of the transistor 318 is connected to the power source Vcc. The emitter of the transistor 326 is connected to 0 potential. Resistors 320, 322, 324 are interposed between the collectors of the transistors 318 and 326. The constant-current source (composed of the transistor 318) supplies the constant current to the diode (composed of the transistor 326), so that a constant potential is generated at the collector of the transistor 326. A potential at the collector of the transistor 318 depends upon the power source voltage Vcc and a bias voltage of the transistor 318. Therefore, a constant voltage can be obtained by dividing the potential difference between the collectors of the transistors 318 and 326 by the resistors 320 and 322, and the resistor 324. This constant voltage is supplied to the differential transistor pair 312 as the reference voltage V1. The potential difference between the collectors of the transistors 318 and 326 is divided by the resistor 320, and the resistors 322 and 324 to obtain a constant voltage. This constant voltage is supplied to a differential transistor pair 342 (to be described later) as the reference voltage V2.

The collector of the transistor 330 is connected to the emitters of the transistors 304, 306 constituting the differential transistor pair 312. The transistor 330 receives at its emitter the power source voltage Vcc. The base of the transistor 330 is connected to the base of the transistor 318. The transistors 330, 318 constitute a current mirror circuit 332 together with a transistor 343 (to be described later). This arrangement allows the constant current to flow to the differential transistor pair 312.

A load resistor 334 is connected between the collector of the transistor 304 and a zero-potential line. The transistor 336 is turned on and off by a voltage developed across the load resistor 334. When the transistor 304 is on and therefore a current flows through the load resistor 334, the transistor 336 is turned on. On the contrary, when the transistor 304 is turned off, the transistor 336 is off.

It can be seen that the switch 30A outputs the current I1 only when the signal SW has a low level. In other words, so long as the potential dividing ratio of the resistors 314, 316 is set to an appropriate value, the potential at the base of the transistor 308 is below the reference voltage V1 only when the signal SW has the low level. In such a case, the transistor 306 is off while the transistor 304 is on. Then, the transistor 336 is turned on to flow the current I1 in the direction shown by an arrow in FIG. 4. On the contrary, when the potential at the base of the transistor 308 exceeds the reference voltage V1, the transistor 304 is off and the transistor 306 is on. Thereafter, the transistor 336 is turned off, thereby preventing flow of the current I1.

The switch 30B includes a differential transistor pair 342, which is composed of transistors 338, 340. One input part of the differential transistor pair 342, i.e. the base of the transistor 338, is connected to a terminal 302 and voltage-dividing resistors 314, 316. The potential at the base of the transistor 338 is equal to the potential at the base of the transistor 308.

The other input part of the differential transistor pair 342, i.e. base of the transistor 340, is connected to the reference voltage generating circuit 328, which generates the reference voltage V2 to be applied to the base of the transistor 340. The reference voltage V2 is higher than the reference voltage V1.

The emitters of the transistors 338, 340 of the differential transistor pair 342 are connected to the collector of the transistor 343. The transistor 343 receives at its emitter the power source voltage Vcc. The base of the transistor 343 is connected to the base of the transistor 318. The differential transistor pair 312 receives the constant current from the current mirror circuit 332.

A load resistor 344 is connected between the collector of the transistor 340 and a zero-potential line. The transistor 346 is turned on and off by a voltage developed across the load resistor 344. Therefore, when the transistor 340 is on and a current flows through the load resistor 344, the transistor 346 is on. When the transistor 340 is off, the transistor 346 is off.

It can be seen that the switch 30B is turned on and off based on the logic opposite to that of the switch 30A. This is because the switch 30B does not have transistors which are equivalent to the transistors 308, 310 of the switch 30A. Therefore, the switch 30B outputs the current I2 only when the signal SW has the high level.

So long as the voltage dividing ratio is appropriate between the resistors 314, 316, the potential at the base of the transistor 338 exceeds the reference voltage V2 only when the signal SW has the high level. In such a case, the transistor 338 is off while the transistor 340 is on. Then, the transistor 346 is turned on, allowing the current I2 to flow in the direction shown by another arrow. On the contrary, when the potential at the base of the transistor 338 is below the reference voltage V2, the transistor 340 is off while the transistor 338 is on. Thereafter, the transistor 346 is turned off, interrupting the current I2.

The switch 30 selects which of the currents I1, I2 to apply to the filters 11, 12. The switch 30 may be composed of integrated circuits. The variable resistor 58 may be added to the circuit of FIG. 4 so as to adjust the reference voltages Vi, V2 or a divided voltage Vb.

A cutoff frequency fc (=fl, f2) is determined according to the constant currents I1, I2 and circuit constants. The circuit constants are constants of capacitance and so on, being determined in the filters 11 to 15. When the circuit constants are unchangeable, the cutoff frequency fc depends upon the constant currents I1, I2. As shown in FIG. 2, the constant current I1 corresponds to the cutoff frequency f1 in the NTSC mode. The constant current I2 corresponds to the cutoff frequency f2 for the PAL mode. Therefore, the current I2 can be easily made (1.4/1.3) I1.

Figure 5:
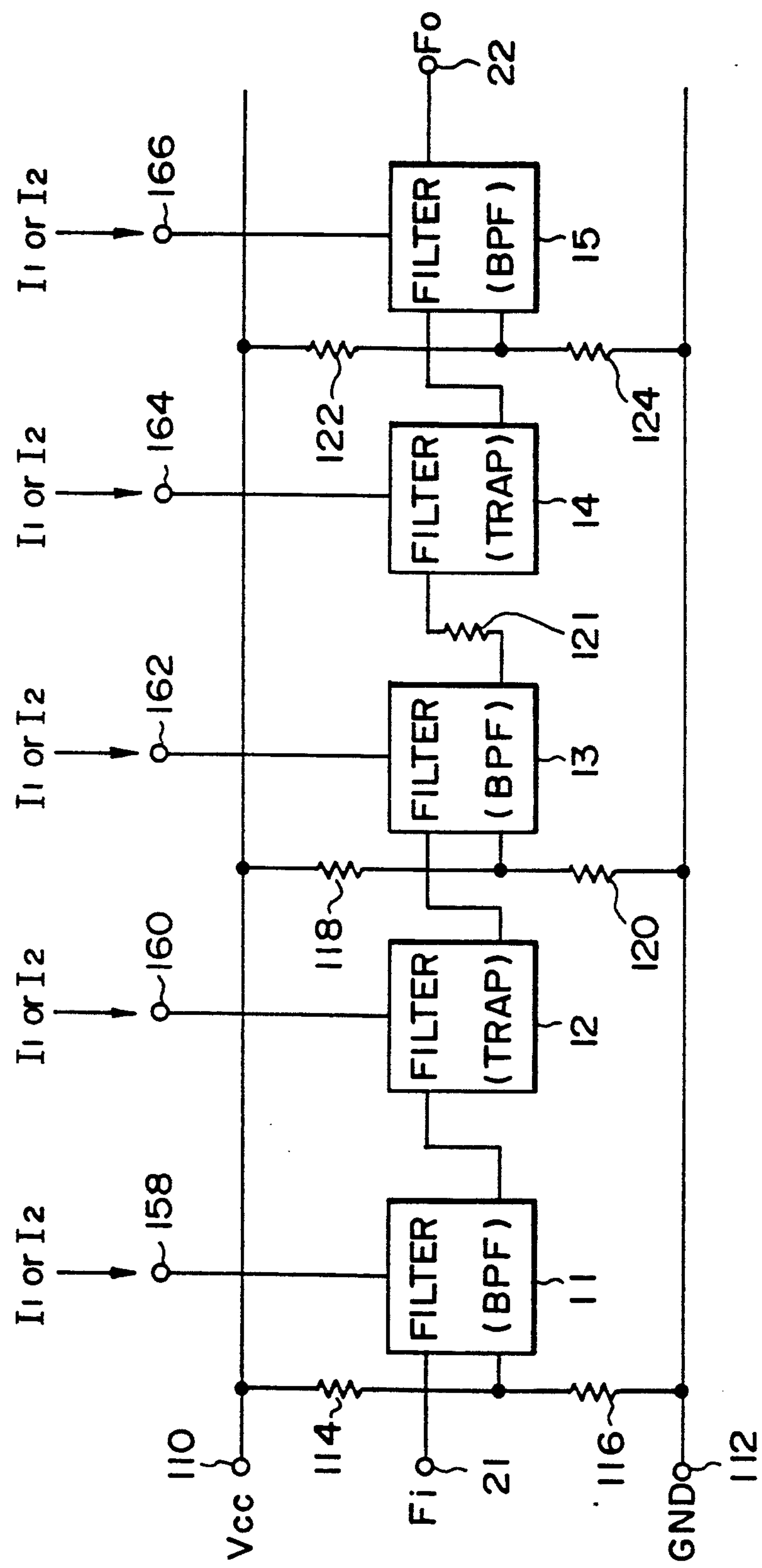
FIG. 5 is a block diagram showing the configuration of a filter equipment of a third embodiment.
Figure 6:
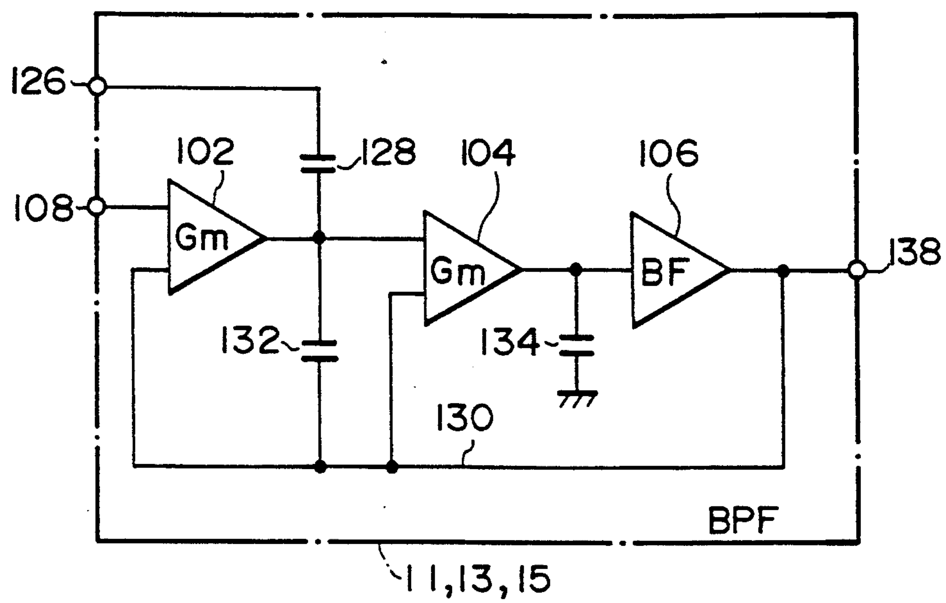
FIG. 6 is a circuit diagram showing filters 11, 13, and 15 of the filter equipment of FIG. 5.
Figure 7:
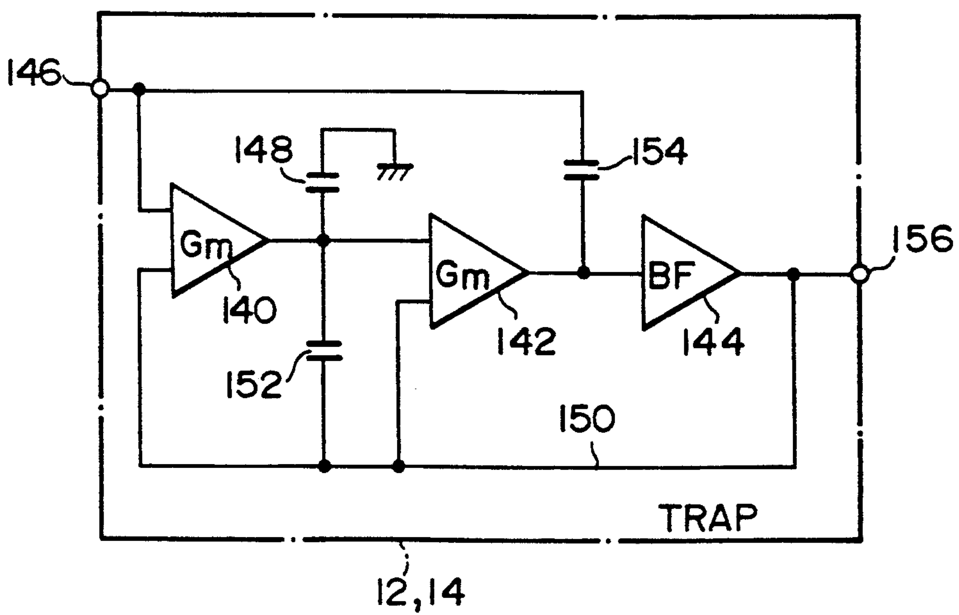
FIG. 7 is a circuit diagram showing filters 12 and 14 of the filter equipment in the third embodiment.
Figure 8:
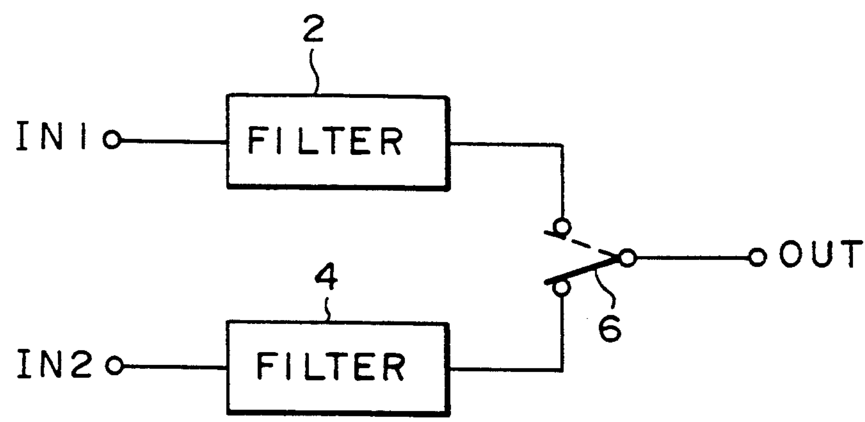
FIG. 8 is a block diagram showing one example of conventional filter equipments.

FIGS. 5 to 7 show a filter equipment according to a third embodiment. The filter equipment comprises filters 11 to 15. The filters 11, 13, 15 are bandpass filters (BPF), and the filters 12, 14 are trap circuits (TRAP).

As shown in FIG. 6, each bandpass filter such as the filter 11, 13 or 15 includes gyration-admittance cells 102 and 104 (hereinafter called "Gm cell 102" and "Gm cell 104"), and a full-feedback buffer circuit (BF) 106. A constant bias voltage is applied to an input terminal 108 via a voltage dividing circuit which is composed of resistors 114 and 116, a voltage dividing circuit composed of resistors 118 and 120, or a voltage dividing circuit composed of resistors 122 and 124. The voltage dividing circuit is inserted between a power source terminal 110 and a grounding terminal 112. An input signal to be filtered is applied to an input terminal 126. The Gm cell 104 is directly connected to an output side of the Gm cell 102 so as to receive an output therefrom. The Gm cell 104 receives an input signal from the input terminal 126 via a capacitor 128. A capacitor 132 is inserted between the Gm cell 104 and a feedback circuit 130. A capacitor 134 is connected to an output side of the Gm cell 104. The full-feedback buffer circuit 106 transmits the output via the output terminal 138. This output is fully fed back to the input parts of the Gm cells 102, 104 via the feedback circuit 130.

Each TRAP circuit such as the filter 12 or 14 includes Gm cells 140, 142 and a full-feedback buffer circuit 144 (BF) as shown in FIG. 7. An input terminal 146 receives an input signal to be filtered. An output part of the Gm cell 140 is directly connected to an input part of the Gm cell 142, being grounded via a capacitor 148. A capacitor 152 is inserted between the output part of the Gm cell 140 and a feedback circuit 150. The output part of the Gm cell 142 is directly connected to the input of the full-feedback buffer circuit 144, which receives an input signal to be filtered, via the input terminal 146 and capacitor 154. The output of the full-feedback buffer circuit 144 is forwarded via the output terminal 156, being fully fed back to the input parts of the Gm cells 140, 142 via the feedback circuit 150.

The cascaded filters 11 to 15 constitute the filter equipment to attain the desired filter characteristics. The output of the filter 13 is fed to the filter 14 via the resistor 121. In this embodiment, the filter equipment includes current input terminals 158, 160, 162, 164, 166 for controlling the operating currents of the Gm cells 102, 104, 140, 142. Therefore, the filter equipment can cope with the NTSC and PAL modes. The currents I1, I2 are selectively applied to these current input terminals according to which of the NTSC and PAL modes is to be used. The right and left channels are indispensable to the NTSC and PAL modes. Therefore, one filter equipment is used for each channel.

According to the foregoing embodiment, the filters 11 to 15 are used in common and their characteristics are selectively controlled according to the constant currents I1, I2. Therefore, this filter equipment can function as effectively as the conventional filter equipment in which different kinds of filters are used to realize desired filter characteristics. When this filter equipment is used as a filter including integrated circuits, it is possible to compact the circuit configuration and to decrease the size of circuit boards and semiconductor substrates. Thereby, a circuit device including the filter equipment can be made compact and inexpensive. When all the circuits are used in common, the filter characteristics can effectively be stabilized and controlled.

In the foregoing embodiment, the filter equipment includes five filters which are cascaded. However, the quantity of the filters may be determined as desired. The filters may be connected in parallel. Further, some filters may be in a cascade connection while some filters may be in a parallel connection. The type of the connections can be determined according to the filter characteristics to be realized or a specification of the filter equipment.

Further, it is not always necessary that all of the filters should have their characteristics controlled as described with reference to the foregoing embodiments.

Although the switches for controlling the filter characteristics are preferably electronic, they may be mechanical or other types. The electronic switches are suitable for controlling the filter characteristics instantaneously and reducing the size of the whole filter equipment.

What is claimed is:

1. A filter equipment comprising:

(a) filter means for filtering an input signal with filter characteristics which vary with applied currents; and (b) current supply means for supplying currents having different values to said filter means, wherein there are a plurality of said filter means, wherein said current supply means includes a plurality of constant-current sources for at least one of said filter means, and connecting means for selectively connecting one of said constant-current sources to said filter means corresponding thereto.

2. A filter equipment according to claim 1, wherein said connecting means includes switches for changing connections between said constant-current sources and said filter means corresponding thereto, and means for controlling said switches.

3. A filter equipment according to claim 1, wherein said filter means include a gyration-admittance cell.

4. A filter equipment according to claim 1, wherein said filter means include a plurality of gyration-admittance cells.

5. A filter equipment according to claim 1, wherein at least two of said filter means are cascaded.

6. A filter equipment according to claim 1, wherein at least two of said filter means are connected in parallel.

7. A filter equipment according to claim 1, wherein said current supply means simultaneously controls the currents to at least two of said filter means.

8. A filter equipment according to claim 1, wherein values of center frequency of said filter means are controlled according to currents to be applied.

9. A filter equipment comprising:

(a) a plurality of interconnected filter means for filtering input signals with filter characteristics which vary according to applied currents;

(b) means for outputting a digital control signal to indicate values of currents to be applied to said filter means;

(c) switches including output terminals according to the number of levels of the control signal, said switches allowing one of said output terminals to send constant currents having different values according to the levels of the control signal;

(d) a plurality of current mirror means connected to said output terminals of said switches, said current mirror means supplying the current when no current arrives via said output terminals, and supplying a current whose value is the same as the current that arrives via said output terminals; and (e) current supply means associated with each said filter means, said current supply means simultaneously receiving constant currents from a plurality of current mirror means and supplying to said filter means currents having values the same as the values of the currents received from said current mirror means.

10. A filter equipment according to claim 9, wherein said switches include means for generating a plurality of reference voltages, and a plurality of means for comparing one of the levels of the reference voltages with the level of a control signal and for outputting a constant current whose value corresponds to the level of the control signal when one of said means for comparing indicates that a preset condition has been met.

11. A filter equipment according to claim 9, wherein said switches are composed of integrated circuits.

12. An Audio Frequency Modulation ("AFM") carrier filter equipment comprising:

(a) a first filter means for receiving television signals and for filtering the input television signals with filter characteristics which vary with an applied current and (b) current supply means for supplying currents having different values to said first filter means, wherein said first filter means receives a first channel input signal of a first system television signal and a first channel input signal of a second system television signal, and said current supply means changes the current values according to which of the first and second systems to use.

13. An AFM carrier filter equipment according to claim 10, further including a second filter means for receiving a second channel signal of the first system television signal and a second channel signal of the second system television signal and for filtering the input signal with filter characteristics which vary with applied currents.

14. A filter equipment comprising:

(a) filter means for filtering an input signal with filter characteristics which vary with applied currents; and (b) current supply means for supplying currents having different values to said filter means, wherein there are a plurality of filter means, wherein said current supply means includes a plurality of constant-current source groups respectively corresponding to a plurality of said filter means, and means for selectively connecting one of said constant-current sources in each of said constant-current source group to said filter means corresponding thereto.

15. A filter equipment according to claim 14, wherein said connecting means includes a plurality of switches for controlling connections between each said constant-current source in each constant-current source group and said filter means corresponding thereto, and means for controlling said switches.

16. A filter equipment according to claim 14, wherein at least two of a plurality of said filter means share one of said constant-current source groups.

17. A filter equipment according to claim 14, wherein said filter means include a gyration-admittance cell.

18. A filter equipment according to claim 14, wherein said filter means includes a plurality of gyration-admittance cells.

19. A filter equipment according to claim 14, wherein at least two of said filter means are cascaded.

20. A filter equipment according to claim 14, wherein at least two of said filter means are connected parallel.

21. A filter equipment according to claim 14, wherein said current supply means simultaneously controls the currents to at least two of said filter means.

22. A filter equipment according to claim 14, wherein values of center frequency of said filter means are controlled according to currents to be applied.

* * * * *